United States Patent
Subramaniyan et al.

(10) Patent No.: US 12,313,078 B2
(45) Date of Patent: May 27, 2025

(54) EXTRACTION IMPELLER FOR AXIAL COMPRESSOR

(71) Applicant: General Electric Company, Schenectady, NY (US)

(72) Inventors: Moorthi Subramaniyan, Bengaluru (IN); Navaneeth Kishan T R, Kadugodi (IN)

(73) Assignee: GE Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 18/307,038

(22) Filed: Apr. 26, 2023

(65) Prior Publication Data
US 2024/0360837 A1    Oct. 31, 2024

(51) Int. Cl.
| F04D 29/18 | (2006.01) |
| F01D 5/14 | (2006.01) |
| F04D 17/02 | (2006.01) |
| F01D 5/06 | (2006.01) |
| F04D 29/32 | (2006.01) |

(52) U.S. Cl.
CPC ........... *F04D 29/181* (2013.01); *F01D 5/141* (2013.01); *F04D 17/025* (2013.01); *F01D 5/06* (2013.01); *F04D 29/324* (2013.01)

(58) Field of Classification Search
CPC .............................. F04D 29/181; F04D 17/025
See application file for complete search history.

(56) References Cited

U.S. PATENT DOCUMENTS

| 5,364,228 A | 11/1994 | Henning et al. |
| 8,220,276 B2 | 7/2012 | Clemen et al. |
| 9,925,862 B2 * | 3/2018 | Hall ........................ B60K 13/04 |
| 10,227,930 B2 | 3/2019 | Saxena et al. |
| 11,111,793 B2 | 9/2021 | Goodhand et al. |
| 2013/0251528 A1 | 9/2013 | Roush et al. |

(Continued)

FOREIGN PATENT DOCUMENTS

| CH | 680010 A5 | 5/1992 |
| CN | 2265446 Y * | 10/1997 |

(Continued)

OTHER PUBLICATIONS

European Search Report from European Patent Application No. 24168471.1 dated Aug. 27, 2024, 8 pages.

*Primary Examiner* — Brian P Wolcott
*Assistant Examiner* — John S Hunter, Jr.
(74) *Attorney, Agent, or Firm* — James Pemrick; Charlotte Wilson; Hoffman Warnick LLC

(57) ABSTRACT

An extraction impeller for an axial compressor includes first vanes having an elongated S-shape arranged on the surface of an impeller body. The first vanes extend radially from an outer flow inlet edge of the body to a flow outlet hub centered on the surface at the rotation axis. A radially inner end of each of the first vanes connects at the flow outlet hub in a direction perpendicular to a rotation axis. Second vane(s) are arranged between adjacent first vanes, and third vanes are arranged between second vanes and between first vanes and second vanes. Second vanes are radially longer than third vanes. The impeller extracts air from the axial compressor and forms an axial flow with reduced vortex whistle. When used in an axial compressor of a gas turbine system, the impeller reduces flow unsteadiness.

25 Claims, 12 Drawing Sheets

(56) References Cited

U.S. PATENT DOCUMENTS

2019/0195127 A1 6/2019 Bintz et al.
2021/0164488 A1 6/2021 Klima et al.

FOREIGN PATENT DOCUMENTS

| CN | 101865157 | A  | 10/2010 |
|----|-----------|----|---------|
| CN | 102287398 | A  | 12/2011 |
| CN | 103775377 | A  | 5/2014  |
| CN | 103953583 | A  | 7/2014  |
| CN | 207583684 | U  | 7/2018  |
| DE | 19617539  | A1 | 11/1997 |
| EP | 1367225   | B1 | 6/2012  |
| JP | 2022057899| A  | 4/2022  |

\* cited by examiner

EXTRACTION IMPELLER FOR AXIAL COMPRESSOR

TECHNICAL FIELD

The disclosure relates generally to turbomachinery. More specifically, the disclosure relates to an extraction impeller for an axial compressor.

BACKGROUND

Axial compressors are used to compress a fluid, such as air, for a variety of purposes. Gas turbine systems are one application for axial compressors. Gas turbine systems include an axial compressor, a combustor, and a turbine. In operation, air flows through and is compressed by the axial compressor and is supplied to the combustor. Specifically, the compressed air is supplied to a fuel nozzle assembly that is integral to the combustor. The fuel nozzle assembly is in flow communication with a fuel source and channels fuel and air to a combustion region of the combustor. The combustor ignites and combusts the fuel. The combustor is in flow communication with the turbine within which gas stream thermal energy is converted to mechanical rotational energy by rotating blades. The rotating blades of the turbine are rotatably coupled to and drive a rotor. The axial compressor may also be rotatably coupled to the rotor.

An extraction impeller may be coupled to a compressor wheel of the axial compressor to extract air from the compressed air flow for other purposes. For example, air may be extracted from the compressed air flow and directed radially inwardly and then through an axial passage to cool portions of the turbine of a gas turbine system. In this example, the circumferential or tangential velocity of the air increases as the air flows radially inwardly to the lower radius, axial passage. The high swirling nature of the air flow generates a vibration in the air flow, which is referred to as a vortex whistle, at the exit of the impeller. The vortex whistle increases as the air flows to larger radius portions of the axial passage, i.e., downstream of the axial compressor adjacent the combustor or in the turbine. The vortex whistle interacts and amplifies an acoustic mode of the structure surrounding the axial passage.

BRIEF DESCRIPTION

All aspects, examples and features mentioned below can be combined in any technically possible way.

An aspect of the disclosure provides an extraction impeller for an axial compressor, the extraction impeller comprising: a body having a rotation axis and a surface perpendicular to the rotation axis; a plurality of first vanes having an elongated S-shape arranged on the surface, the plurality of first vanes extending radially from an outer flow inlet edge of the body to a flow outlet hub centered on the surface at the rotation axis, wherein a radially inner end of each of the plurality of first vanes connect at the flow outlet hub in a direction perpendicular to the rotation axis; a plurality of second vanes arranged on the surface, at least one of the plurality of second vanes between adjacent first vanes; and a plurality of third vanes arranged on the surface between any adjacent second vanes and between adjacent first vanes and second vanes, wherein the at least one of the plurality of second vanes is radially longer than the plurality of third vanes.

Another aspect of the disclosure includes any of the preceding aspects, and the at least one of the plurality of second vanes includes a fourth vane and a fifth vane arranged on the surface between adjacent first vanes.

Another aspect of the disclosure includes any of the preceding aspects, and the fourth vane has a radially inner end distanced from the rotation axis by a first radial distance, the fifth vane has a radially inner end distanced from the rotation axis by a second radial distance, and each third vane has a radially inner end distanced from the rotation axis by a third radial distance, wherein the first, second and third radial distances are different and the first and second radial distances are less than the third radial distance.

Another aspect of the disclosure includes any of the preceding aspects, and distal axial ends of the plurality of first vanes, the plurality of second vanes and the plurality of third vanes are coplanar.

Another aspect of the disclosure includes any of the preceding aspects, and the surface of the body includes a planar portion and a domed portion surrounding the rotation axis and extending gradually farther axial than the planar portion, wherein radially inner ends of the plurality of first vanes and the plurality of second vanes are axially shorter than radially outer ends of the plurality of first vanes and the plurality of second vanes, respectively.

Another aspect of the disclosure includes any of the preceding aspects, and radially inner ends of the plurality of third vanes are located at a transition line between the planar portion and the domed portion of the surface of the body.

Another aspect of the disclosure includes any of the preceding aspects, and a radially outer end of the plurality of first vanes, the plurality of second vanes and the plurality of third vanes terminate at the outer flow inlet edge of the body.

Another aspect of the disclosure includes any of the preceding aspects, and the body is circular and a radially outer end of the plurality of first vanes, the plurality of second vanes and the plurality of third vanes are circumferentially equidistantly spaced at the outer flow inlet edge of the body.

Another aspect of the disclosure includes any of the preceding aspects, and the flow outlet hub centered on the surface at the rotation axis has a multi-pointed star shape with each point thereof coupled to the radial inner end of a respective first vane of the plurality of first vanes.

Another aspect of the disclosure includes any of the preceding aspects, and radially inner ends of the plurality of second vanes and the plurality of third vanes direct an air flow in a direction tangential to the rotation axis.

Another aspect of the disclosure includes any of the preceding aspects, and the plurality of second vanes have a turning angle relative to a radius of the body in a range of 28° to 32°, and wherein the plurality of third vanes have a flow exit angle relative to the radius of the body in a range of 10° to 14°.

Another aspect of the disclosure includes any of the preceding aspects, and the body includes a mount configured to couple to a compressor wheel of an axial compressor, wherein a radial outer region of the body is in fluid communication with a compressed air passage of the axial compressor and a center region of the body is in fluid communication with an axial passage in the axial compressor.

Another aspect of the disclosure includes any of the preceding aspects, and the plurality of first vanes includes five first vanes, the plurality of second vanes includes ten second vanes, and the plurality of third vanes includes fifteen third vanes.

Another aspect of the disclosure includes a compressor wheel for an axial compressor, the compressor wheel comprising: a wheel body for coupling to a rotor; a plurality of rotating blades coupled to the main wheel body for compressing an air flow in a compressed air passage; and an extraction impeller coupled to the wheel body and in fluid communication with the compressed air passage, the extraction impeller including: an impeller body having a rotation axis and a surface perpendicular to the rotation axis; a plurality of first vanes having an elongated S-shape arranged on the surface, the plurality of first vanes extending radially from an outer flow inlet edge of the impeller body to a flow outlet hub centered on the surface at the rotation axis, wherein a radially inner end of each of the plurality of first vanes connect at the flow outlet hub in a direction perpendicular to the rotation axis; a plurality of second vanes arranged on the surface, at least one of the plurality of second vanes between adjacent first vanes; and a plurality of third vanes arranged on the surface between any adjacent second vanes and between adjacent first vanes and second vanes, wherein the at least one of the plurality of second vanes is radially longer than the plurality of third vanes.

Another aspect of the disclosure includes any of the preceding aspects, and the at least one of the plurality of second vanes includes a fourth vane and a fifth vane arranged on the surface between adjacent first vanes.

Another aspect of the disclosure includes any of the preceding aspects, and the fourth vane has a radially inner end distanced from the rotation axis by a first radial distance, the fifth vane has a radially inner end distanced from the rotation axis by a second radial distance, and each third vane has a radially inner end distanced from the rotation axis by a third radial distance, wherein the first, second and third radial distances are different and the first and second radial distances are less than the third radial distance.

Another aspect of the disclosure includes any of the preceding aspects, and distal axial ends of the plurality of first vanes, the plurality of second vanes and the plurality of third vanes are coplanar.

Another aspect of the disclosure includes any of the preceding aspects, and the surface of the body includes a planar portion and a domed portion surrounding the rotation axis and extending gradually farther axial than the planar portion, wherein radially inner ends of the plurality of first vanes and the plurality of second vanes are axially shorter than radially outer ends of the plurality of first vanes and the plurality of second vanes, respectively.

Another aspect of the disclosure includes any of the preceding aspects, and radially inner ends of the plurality of third vanes are located at a transition line between the planar portion and the domed portion of the surface of the body.

Another aspect of the disclosure includes any of the preceding aspects, and a radially outer end of the plurality of first vanes, the plurality of second vanes and the plurality of third vanes terminate at the outer flow inlet edge of the body.

Another aspect of the disclosure includes any of the preceding aspects, and the body is circular and a radially outer end of the plurality of first vanes, the plurality of second vanes and the plurality of third vanes are circumferentially equidistantly spaced at the outer flow inlet edge of the body.

Another aspect of the disclosure includes any of the preceding aspects, and the flow outlet hub centered on the surface at the rotation axis has a multi-pointed star shape with each point thereof coupled to the radial inner end of a respective first vane of the plurality of first vanes.

Another aspect of the disclosure includes any of the preceding aspects, and radially inner ends of the plurality of second vanes and the plurality of third vanes direct an air flow in a direction tangential to the rotation axis.

Another aspect of the disclosure includes any of the preceding aspects, and the plurality of second vanes have a turning angle relative to a radius of the body in a range of 28° to 32°, and wherein the plurality of third vanes have a flow exit angle relative to the radius of the body in a range of 10° to 14°.

Another aspect of the disclosure includes any of the preceding aspects, and the body includes a mount configured to couple to a compressor wheel of an axial compressor, wherein a radial outer region of the body is in fluid communication with a compressed air passage of the axial compressor and a center region of the body is in fluid communication with an axial passage in the axial compressor.

Another aspect of the disclosure includes any of the preceding aspects, and the plurality of first vanes includes five first vanes, the plurality of second vanes includes ten second vanes, and the plurality of third vanes includes fifteen third vanes.

An aspect of the disclosure includes a gas turbine system, comprising: an axial compressor including a compressor wheel according to any of the preceding aspects relating to a compressor wheel; a combustor operatively coupled to the axial compressor; and a gas turbine operatively coupled to the combustor.

Two or more aspects described in this disclosure, including those described in this summary section, may be combined to form implementations not specifically described herein. That is, all embodiments described herein can be combined with each other.

The details of one or more implementations are set forth in the accompanying drawings and the description below. Other features, objects and advantages will be apparent from the description and drawings, and from the claims.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
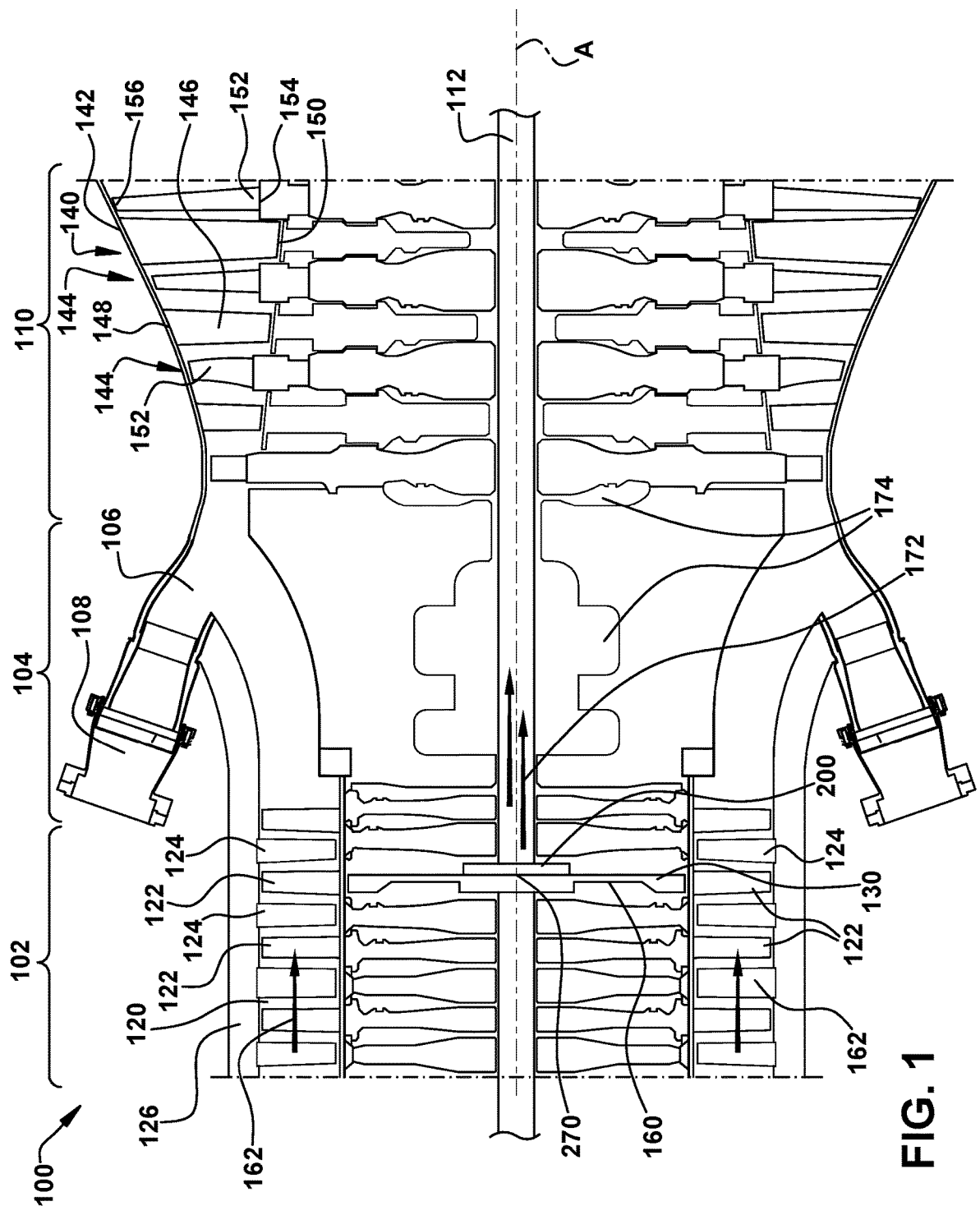
FIG. 1 shows a cross-sectional view of an illustrative turbomachine in the form of a gas turbine system including an axial compressor having a compressor wheel with an extraction impeller, according to embodiments of the disclosure.

It is noted that the drawings of the disclosure are not necessarily to scale. The drawings are intended to depict only typical aspects of the disclosure and therefore should not be considered as limiting the scope of the disclosure. In the drawings, like numbering represents like elements between the drawings.

DETAILED DESCRIPTION

As an initial matter, in order to clearly describe the current disclosure, it will become necessary to select certain terminology when referring to and describing relevant machine components within the illustrative application of a turbomachine. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of an air, such as the working air through the turbomachine or, for example, the flow of air through the combustor or coolant through one of the turbomachine's component systems. The term "downstream" corresponds to the direction of flow of the air, and the term "upstream" refers to the direction opposite to the flow. The terms "forward" and "aft," without any further specificity, refer to directions, with "forward" referring to the front or compressor end of the turbomachine, and "aft" referring to the rearward or turbine end of the turbomachine.

It is often required to describe parts that are at different radial positions with regard to a center axis. The term "axial" refers to movement or position parallel to an axis, e.g., a rotation axis of a turbomachine or extraction impeller. The term "radial" refers to movement or position perpendicular to an axis, e.g., a rotation axis of a compressor or extraction impeller. In cases such as this, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. Finally, the term "circumferential" refers to movement or position around an axis, e.g., a circumferential exterior edge of an extraction impeller extending about a rotation axis of the impeller. As indicated above, it will be appreciated that such terms may be applied in relation to the rotation axis of the turbomachine and/or an axis of an extraction impeller, which may be coextensive.

In addition, several descriptive terms may be used regularly herein, as described below. The terms "first," "second," and "third," may be used interchangeably to distinguish one component from another and are not intended to signify location or importance of the individual components.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event may or may not occur or that the subsequently described feature may or may not be present and that the description includes instances where the event occurs or the feature is present and instances where the event does not occur or the feature is not present.

Where an element or layer is referred to as being "on," "engaged to," "connected to," "coupled to," or "mounted to" another element or layer, it may be directly on, engaged, connected, coupled, or mounted to the other element or layer, or intervening elements or layers may be present. In contrast, when an element is referred to as being "directly on," "directly engaged to," "directly connected to," or "directly coupled to" another element or layer, there are no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items. The verb forms of "couple" and "mount" may be used interchangeably herein.

Embodiments of the disclosure include an extraction impeller for an axial compressor. The extraction impeller includes first vanes having an elongated S-shape arranged on the surface of an impeller body. The first vanes extend radially from an outer flow inlet edge of the body to a flow outlet hub centered on the surface at the rotation axis of the impeller. A radially inner end of each of the first vanes connects at the flow outlet hub in a direction perpendicular to a rotation axis. Second vane(s) are arranged between adjacent first vanes, and third vanes are arranged between second vanes or between first vanes and second vanes. The second vanes are radially longer than the third vanes. The impeller extracts air from the axial compressor and forms an axial flow in an axial flow passage with less circumferential or tangential parameters compared to conventional impellers to reduce vortex whistle and flow unsteadiness.

FIG. 1 shows a cross-sectional view of one illustrative application for an extraction impeller for a compressor wheel of an axial compressor according to embodiments of the disclosure. More particularly, FIG. 1 shows a combustion or gas turbine system 100 (hereafter "GT system 100") in which the teachings of the disclosure can be used. GT system 100 includes an axial compressor 102 including a compressor wheel 130 according to embodiments of the disclosure. GT system 100 also includes a combustor 104 operatively coupled to axial compressor 102, and a turbine 110 operatively coupled to combustor 104. Combustor 104 includes a combustion region 106 and a fuel nozzle assembly 108. GT system 100 also includes a common compressor/turbine shaft 112 (sometimes referred to as a rotor 112). In one embodiment, GT system 100 is a 7HA.03 engine, commercially available from General Electric Company, Greenville, S.C. The present disclosure is not limited to any one particular GT system and may be implanted in connection with other engines including, for example, the other HA, F, B, LM, GT, TM and E-class engine models of General Electric Company, and engine models of other companies. Furthermore, the present disclosure is not limited to any particular turbomachine, and may be applicable to, for example, steam turbines, jet engines, compressors, turbofans, etc.

In operation, air flows through axial compressor 102 (hereafter "compressor 102") and is compressed in a compressed air passage 120 by stages of rotating blades 122 positioned between stationary nozzles 124 that are coupled to a compressor casing 126. Rotating blades 122 within each stage are coupled to a respective compressor wheel 130 that couples to rotor 112. Compressed air is supplied to combustor 104 via compressed air passage 120. Specifically, the compressed air is supplied to fuel nozzle assembly 108 that is integral to combustion region 106. That is, fuel nozzle assembly 108 is in flow communication with combustion region 106. Fuel nozzle assembly 108 is also in flow communication with a fuel source (not shown) and channels fuel and air to combustion region 106. Combustor 104 ignites and combusts fuel. Combustor 104 is in flow communication with turbine 110 for which gas stream thermal energy is converted to mechanical rotational energy. Turbine 110 rotatably couples to and drives rotor 112. Compressor 102 is also rotatably coupled to rotor 112 via compressor wheels 130. In the illustrative embodiment, there is a plurality of combustors 104 and fuel nozzle assemblies 108.

Turbine 110 includes a row of nozzle or vanes 140 coupled to a stationary casing 142 of GT system 100 and are axially adjacent a row of rotating blades 144. A nozzle or vane 146 may be held in turbine 110 by a radially outer platform 148 and a radially inner platform 150. Each row or stage of blades 144 in turbine 110 includes rotating blades 152 coupled to rotor 112 and rotating with the rotor. Rotating blades 152 may include a radially inward platform 154 (at root of blade coupled to rotor 112) and a radially outward tip 156.

Compressor wheel 130 for axial compressor 102 includes a wheel body 160 for coupling to rotor 112 and rotatably mounting a plurality of rotating blades 122. Wheel body 160 may include any now known or later developed structure for rotatably coupling to rotor 112 and coupling rotating blades 122 to rotor 112 at a selected axial position of rotor 112, e.g., a dovetail on the blade with mating slot in wheel body 160. Each blade stage of compressor 102 may have a respective wheel body 160 for mounting rotating blades 122 of a particular size, shape, length. Each stage of rotating blades 122 is coupled to a respective wheel body 160 for compressing an air flow in a compressed air passage 120. Each stage in compressor 102 may also include a respective upstream and downstream nozzle stage to direct air to rotating blades 122 of a downstream blade stage. Nozzles 124 are stationary and mounted to compressor casing 126. In the non-limiting example shown, compressor 102 may include ten blade stages and ten nozzle stages.

Air can be extracted from compressed air flow 162 for purposes other than combustor 104, e.g., cooling parts of turbine 110 (FIG. 1). The source of extracted air can be selected based on characteristics of the air at the particular axial location in compressor 102, e.g., air pressure, flow rate, etc. Where air extraction is to occur, wheel body 160 may include an extraction impeller 200 coupled to wheel body 160 and in fluid communication with compressed air passage 120. Extraction impeller 200 draws air from compressed air passage 120 radially inwardly toward an axis of rotor 112 (i.e., rotation axis A of turbomachine and/or an extraction impeller) and then directs the air axially through an axial passage 172 toward turbine 110. Axial passage 172 is an inner portion of axial compressor 102 and can have any form that directs air generally axially relative to rotor 112. As understood in the art, axial passage 172 may have a variety of larger diameter sections 174 along its length for delivery of air to different locations radially outward from the center of rotor 112. Larger diameter sections 174 can be within rotor 112. Extraction impeller 200 can be located on any wheel body 160 at any stage. The particular wheel body 160 and stage used may be selected to provide, for example, the desired air flow from compressed air passage 120. More particularly, the particular wheel body 160 and stage used may be selected depending on the characteristics of the air flow or axial compressor 102 at that location in compressed air passage 120. For example, the wheel body 160 may be chosen based on: air pressure, flow rate, temperature, or an area in axial compressor 102 have available space for extraction purposes.

Figure 2:
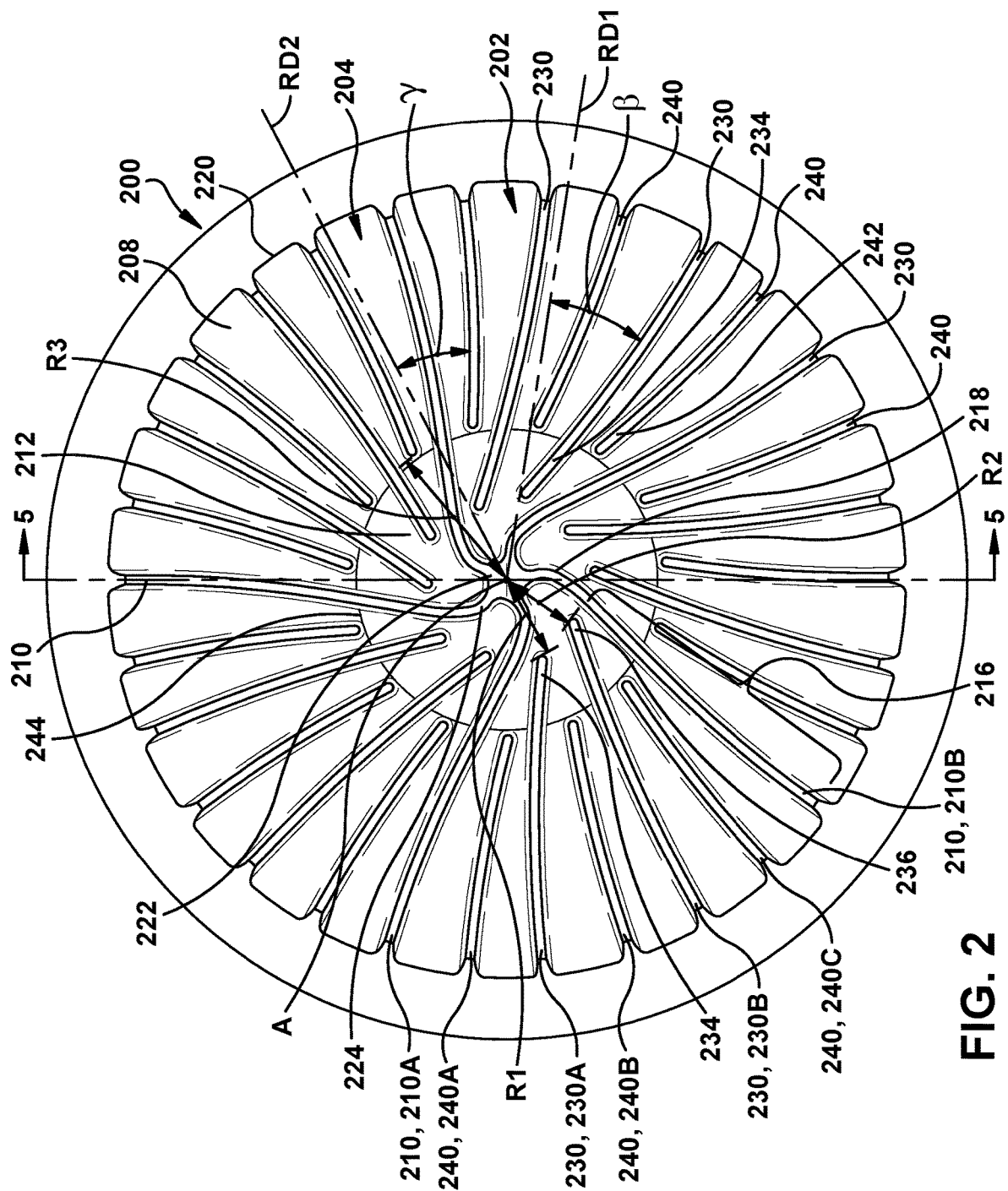
FIG. 2 shows an end view of an extraction impeller, according to embodiments of the disclosure.
Figure 3:
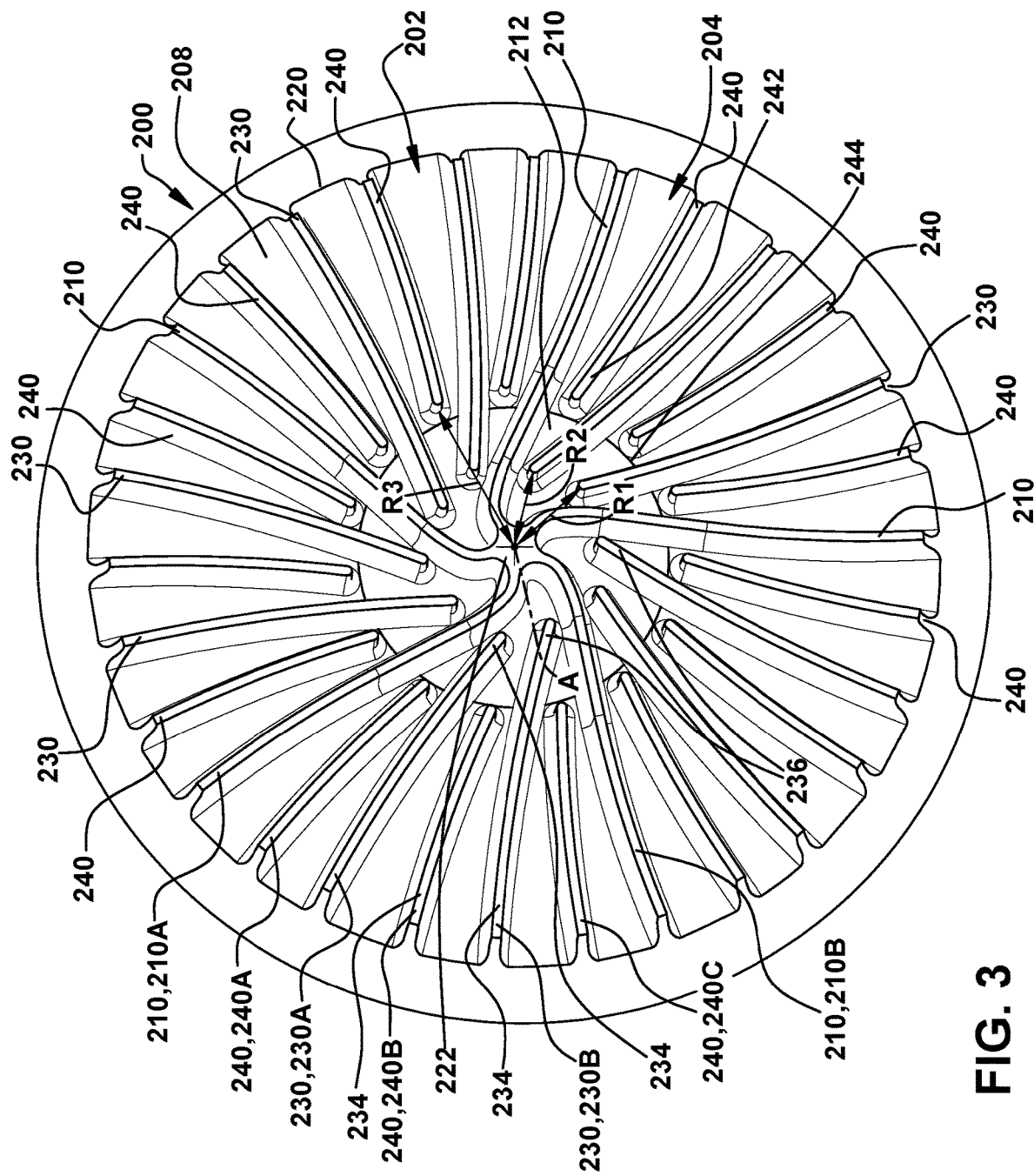
FIG. 3 shows a perspective end view of an extraction impeller, according to embodiments of the disclosure.
Figure 4:
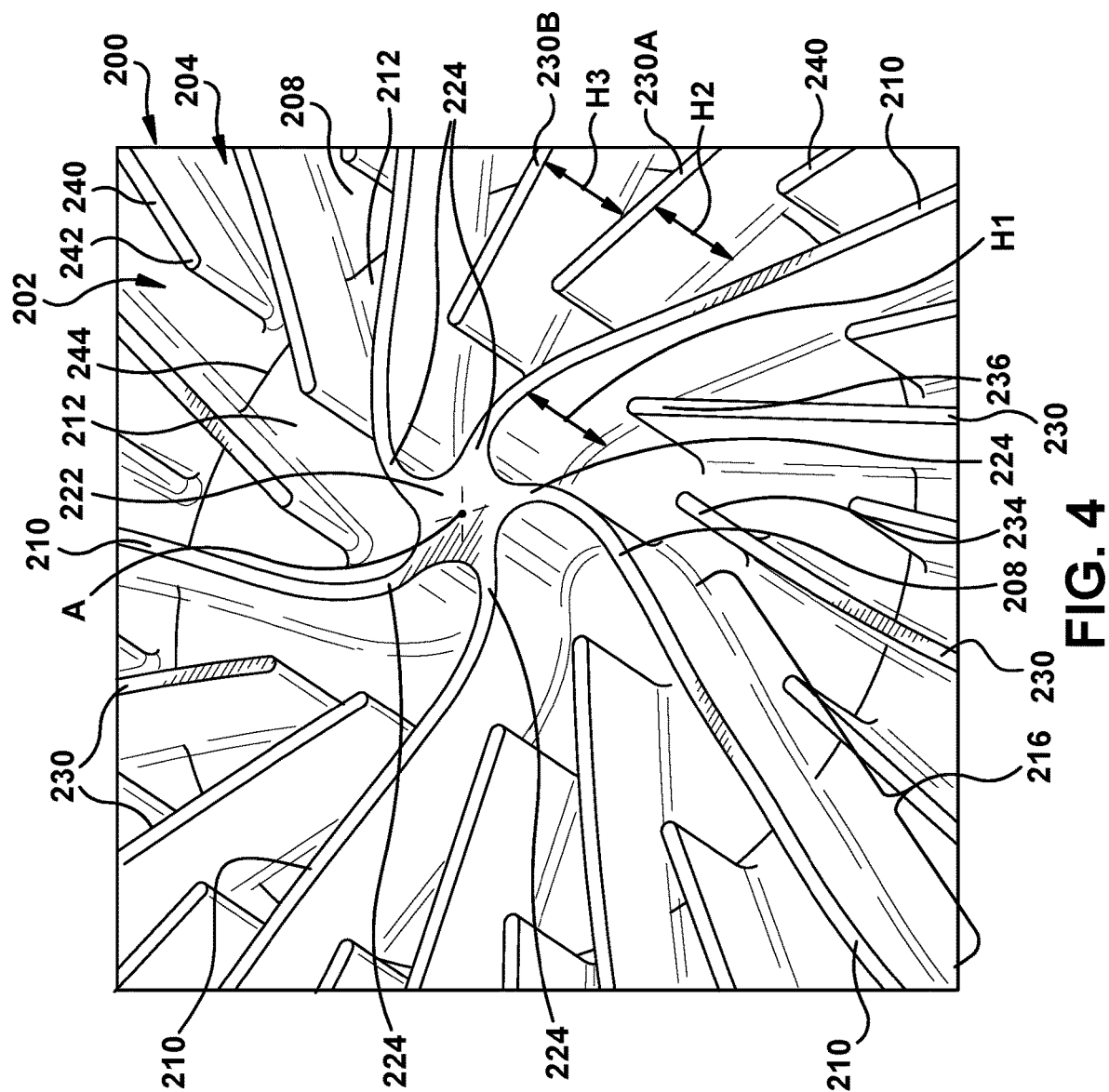
FIG. 4 shows an enlarged perspective view of a flow outlet hub at a center of an impeller, according to embodiments of the disclosure.

FIG. 2 shows an axial end view and FIG. 3 shows a perspective end view of an extraction impeller 200 (hereafter "impeller 200"), according to embodiments of the disclosure. FIG. 4 shows an enlarged perspective view of a flow outlet hub at a center of impeller 200, according to embodiments of the disclosure. Impeller 200 may include a body 202 having a rotation axis A and a surface 204 that is (generally) perpendicular to rotation axis A. As will be described herein, an opposing surface 206 (FIG. 5) to surface 204 may couple to wheel body 160 of compressor wheel 130 (FIG. 1). In certain embodiments, body 202 is circular, but some variance from circular may be possible. Rotation axis A may be coextensive with that of rotor 112 (FIG. 1) of turbomachine 100 (FIG. 1). As will be described further herein, surface 204 of body 202 may include a planar portion 208 and a domed portion 212. Domed portion 212 surrounds rotation axis A and extends gradually farther axial, i.e., toward turbine 110 (FIG. 1) than planar portion 208.

Impeller 200 may include a plurality of vanes configured to draw air radially inward from compressed air passage 120 and direct it axially into axial passage 172 (FIG. 1) with decreased vortex whistle compared to conventional impellers. The various vanes extend axially from surface 204, i.e., towards turbine 110 (FIG. 1). Impeller 200 includes a plurality of first vanes 210 having an elongated S-shape arranged on surface 204. As used herein, "elongated S-shape" indicates first vanes 210 have connected concave surfaces facing in opposing directions but in a lengthened arrangement compared to an equally balanced 'S' shape, e.g., as printed here. In addition, the concave surfaces do not have the same radius of curvature. For example, as labeled for a selected first vane 210 in FIGS. 2 and 4, each first vane 210 can include a first concave surface 216 have a relatively large radius of curvature and a second concave surface 218 having a relatively small radius of curvature connected to first concave surface 216. First vanes 210 extend radially from an outer flow inlet edge 220 of body 202 to a flow outlet hub 222 centered on surface 204 at rotation axis A. A radially inner end 224 of each first vane 210 connects at flow outlet hub 222 in a direction perpendicular to rotation axis A. In other words, if radially inner ends 224 of first vanes 210 were extended (i.e., with structure from an opposing side of flow outlet hub 222 removed), they would intersect rotation axis A. First vanes 210 thus direct an air flow guided thereby directly toward rotation axis A.

Flow outlet hub 222 is centered on surface 204 at rotation axis A, and has a multi-pointed star shape with each point thereof coupled to radial inner end 224 of a respective first vane 210 of plurality of first vanes 210. More particularly, due to second concave surfaces 218 of inner radial ends 224 of first vanes 210, flow outlet hub 222 has a shape of multi-pointed star with slightly curved star portions. The curved star portions enlarge from radial inner end 224 of a respective first vane 210 as they approach rotation axis A to form the star-shaped flow outlet hub 222. Flow outlet hub 222 has as many points as there are first vanes 210 coupled thereto. In the examples shown in FIGS. 2-4, flow outlet hub 222 has five points, one for each first vane 210. As will be described herein, flow outlet hub 222 may couple different numbers of first vanes 210 (see e.g., FIG. 7). In any event, flow outlet hub 222 directs air flow axially into axial passage 172 (FIG. 1).

Impeller 200 also includes a plurality of second vanes 230 arranged on surface 204. At least one of plurality of second vanes 230 is/are between adjacent first vanes 210. For example, as shown in FIG. 2 at one location, second vanes 230A, 230B are between adjacent first vanes 210A, 210B. In certain embodiments, shown in FIGS. 2-4, second vanes 230 may include two vanes—a fourth vane 230A and a fifth vane 230B arranged on surface 204 between adjacent first vanes 210. Second vanes 230 are shorter than first vanes 210.

Impeller 200 also includes a plurality of third vanes 240 arranged on surface 204 between any adjacent second vanes 230 and between adjacent first vanes 210 and second vanes 230. In the example shown in FIGS. 2-3, three third vanes 240A-C are provided between each pair of adjacent first vanes 210A-B. More particularly, as shown at one location in each of FIGS. 2 and 3, one third vane 240A is between first vane 210A and second vane 230A, one third vane 240B is between second vanes 230A, 230B, and one third vane 240C is between first vane 210B and second vane 230B. As shown in FIGS. 2-3, the described pattern of vanes 210, 230, 240 repeats around body 202 five times.

Radially outer ends of first vanes 210, second vanes 230 and third vanes 240 all terminate at an outer flow inlet edge 220 of body 202. Hence, radial outer ends of vanes 210, 230, 240 are coextensive at a radial location at outer flow inlet edge 220, i.e., radial outer edge of surface 204. As shown in FIGS. 2-3, radially outer ends of first vanes 210, second vanes 230 and third vanes 240 are circumferentially equidistantly spaced at outer flow inlet edge 220 of body 202, e.g., to ensure even draw of air into impeller 200 from compressed air passage 120.

Figure 9:
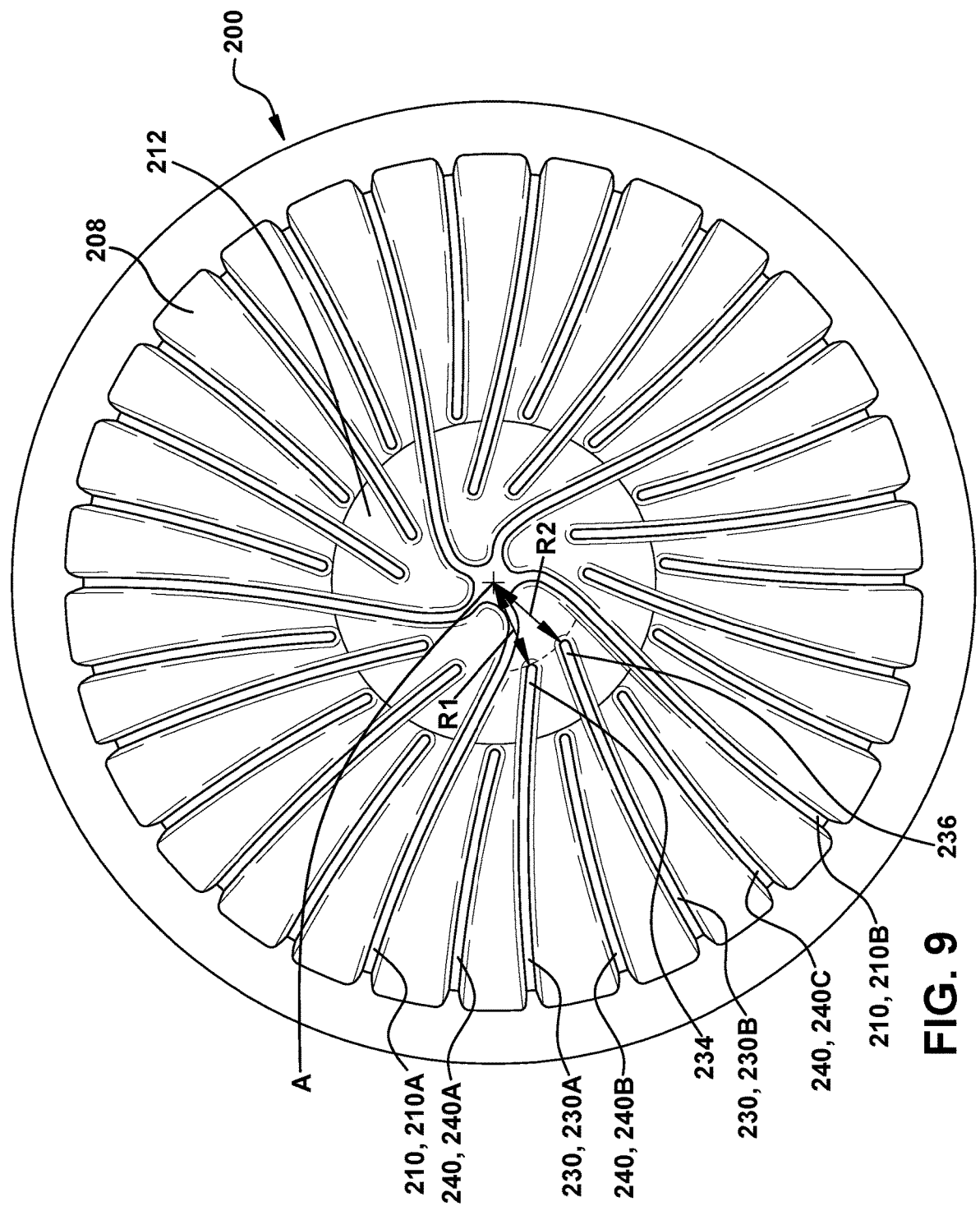
FIG. 9 shows an end view of an extraction impeller, according to embodiments of the disclosure.

Radial inner ends of first, second and third vanes 210, 230, 240 with flow outlet hub 222 and domed portion 212 are configured to direct air flow in an axial direction along axial passage 172 with less circumferential or tangential parameters compared to conventional impellers to reduce vortex whistle. Second vanes 230 are radially longer than third vanes 240 and extend from outer flow inlet edge 220 to an area on domed portion 212. In contrast, third vanes 240 extend from outer flow inlet edge 220 to radial inner ends 242 that terminate at an outer radial edge or transition line 244 of domed portion 212 with planar portion 208 of surface 204. That is, radial inner ends 242 of third vanes 240 are located at transition line 244 between planar portion 208 and domed portion 212 of surface 204 of body 202. More particularly, second (fourth) vane 230A has a radially inner end 234 distanced from rotation axis A by a first radial distance R1 and second (fifth) vane 230B has a radially inner end 236 distanced from rotation axis A by a second radial distance R2. In contrast, each third vane 240 has a radially inner end 242 distanced from rotation axis A by a third radial distance R3. In certain embodiments, as shown in FIGS. 2-4, first, second and third radial distances R1, R2, R3 are all different, and first and second radial distances R1, R2 are less than third radial distance R3. In some embodiments, as shown in FIG. 3, radial distance R1 and radial distance R2 are different. In other embodiments, as shown in FIG. 9, radial distance R1 and radial distance R2 may be the same.

Figure 5:
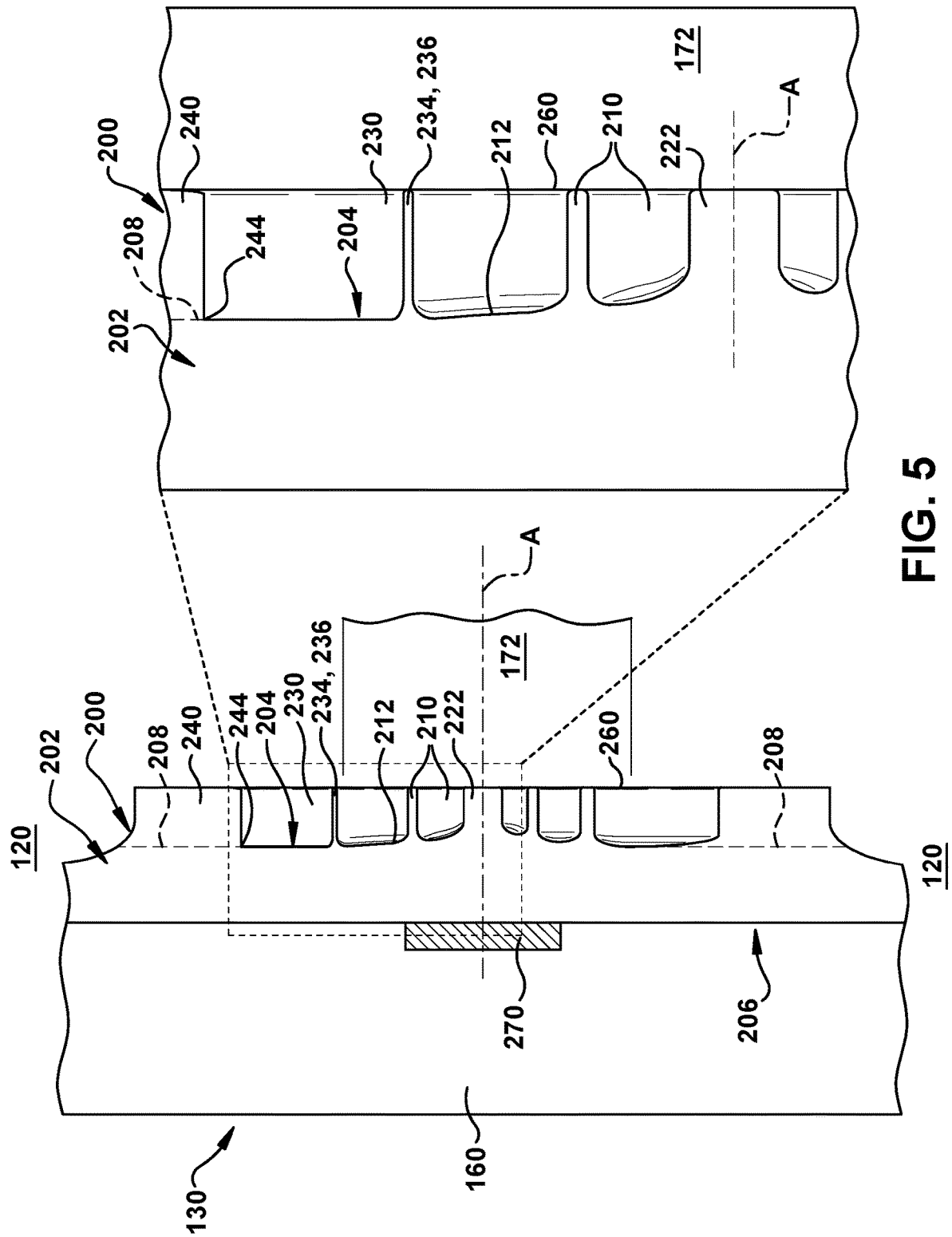
FIG. 5 shows a cross-sectional view of an impeller along view line 5-5 in FIG. 2 and with an enlarged view section, according to embodiments of the disclosure.
Figure 6:
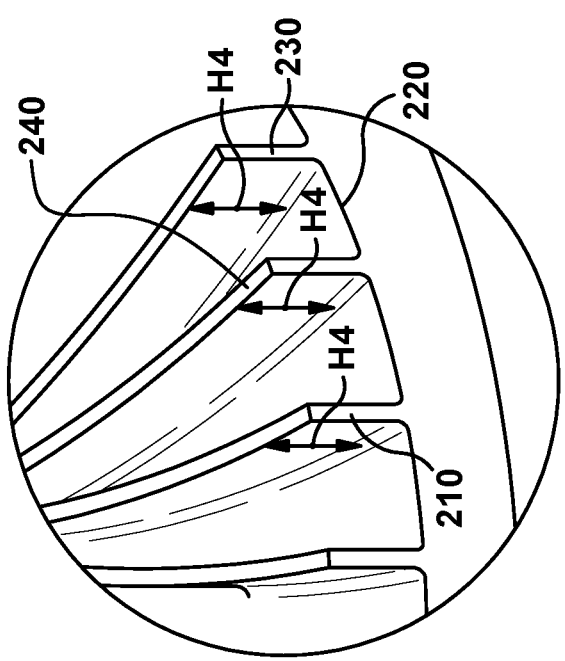
FIG. 6 shows an enlarged perspective view of a flow inlet edge of an impeller, according to embodiments of the disclosure.

With further regard to dome portion 212, FIG. 5 shows a cross-sectional view of impeller 200 along view line 5-5 in FIG. 2 and including an enlarged view section of domed portion 212. FIG. 6 shows an enlarged perspective view of outer flow inlet edge 220 at a radial outer region of impeller 200. Surface 204 of body 202 includes planar portion 208, which can be circular and encircles, domed portion 212. Outer radial edge (transition line) 244 of domed portion 212 is defined where it meets planar portion 208, i.e., at a circular transition line. As shown in FIGS. 2-4, domed portion 212 surrounds rotation axis A and extends gradually farther axially (i.e., toward turbine 110 in FIG. 1 and right on page in FIG. 5) than planar portion 208, as it gets closer to flow outlet hub 222. In this manner, as air flows radially inward toward flow outlet hub 222, domed portion 212 also directs flow axially toward axial passage 172.

As also shown in FIG. 5, distal axial ends 260 of first vanes 210, second vanes 230 and third vanes 240 are coplanar. That is, all the vanes 210, 230, 240 extend to a respective axial extent that results in distal axial ends 260 thereof being in the same plane. Dome portion 212, however, results in radially inner ends 224 (FIGS. 2-4) of first vanes 210 (adjacent flow outlet hub 222) and radially inner ends 234, 236 (FIGS. 2-4) of second vanes 230 being axially shorter than radially outer ends (at outer flow inlet edge 220) of first vanes 210 and second vanes 230, respectively. That is, as observed in FIGS. 5 and 6, axial heights H1 of radial inner ends 224 of first vanes 210 from surface 204 of domed portion 212 adjacent flow outlet hub 222 and heights H2, H3 of radial inner ends 234, 236 of second vanes 230A, 230B, respectively, from surface 204 of domed portion 212, are shorter than height H4 of first vanes 210 and second vanes 230A-B at radially outer ends thereof, i.e., at outer flow inlet edge 220 of body 202. Heights H4 of vanes 210, 230 at outer flow inlet edge 220 of body 202 can be the same.

As shown in FIG. 2, radially inner ends 234, 236 of second vanes 230 and radial inner ends 242 of third vanes 240 direct an air flow in a direction tangential to rotation axis A, i.e., not directly at rotation axis A. To this end, second vanes 230 may have a turning angle β relative to a radius RD1 of body 202 in a range of 28° to 32°, and third vanes 240 may have a flow exit angle γ relative to a radius RD2 of body 202 in a range of 10° to 14°. A turning angle of a given vane 230, 240 can be identified by the angle where a straight line extending through both radially inner and outer ends of the given vane (see FIG. 2) intersects a respective radius (e.g., RD1, RD2) of body 202 that intersects the radial inner end of the given vane. Radius RD1 intersects radial inner end 234 (shown) or 236 of a respective second vane 230A, 230B, and radius RD2 intersects radial inner end 242 of third vane 240.

As shown in FIGS. 1 and 5, body 202 may include any now known or later developed mount 270 configured for coupling body 202 to compressor wheel 130 of axial compressor 102. Opposing surface 206 to surface 204 of body 202 may be configured to couple to compressor wheel 130 of axial compressor 102 using mount 270 in any now known or later developed fashion. As shown in FIG. 1, outer flow inlet edge 220 of body 202 is in fluid communication with compressed air passage 120 of axial compressor 102 and a center region of body 202, i.e., at or near flow outlet hub 222, is in fluid communication with axial passage 172 in axial compressor 102.

In the embodiments shown in FIGS. 2-4, five repeating arrangements of vanes 210, 230, 240 are provided. In this case, first vanes 210 include five (5) first vanes 210, second vanes 230 include ten (10) second vanes 230 (i.e., with two second vanes 230A, 230B between each pair of adjacent first vanes 210A, 210B), and third vanes 240 include fifteen (15) third vanes 240 (i.e., with one third vane 240B between each pair of adjacent second vanes 230A, 230B and one third vane 240A between adjacent first vanes 210A and second vanes 230A and one third vane 240C between adjacent first vanes 210B and second vanes 230B).

Figure 7:
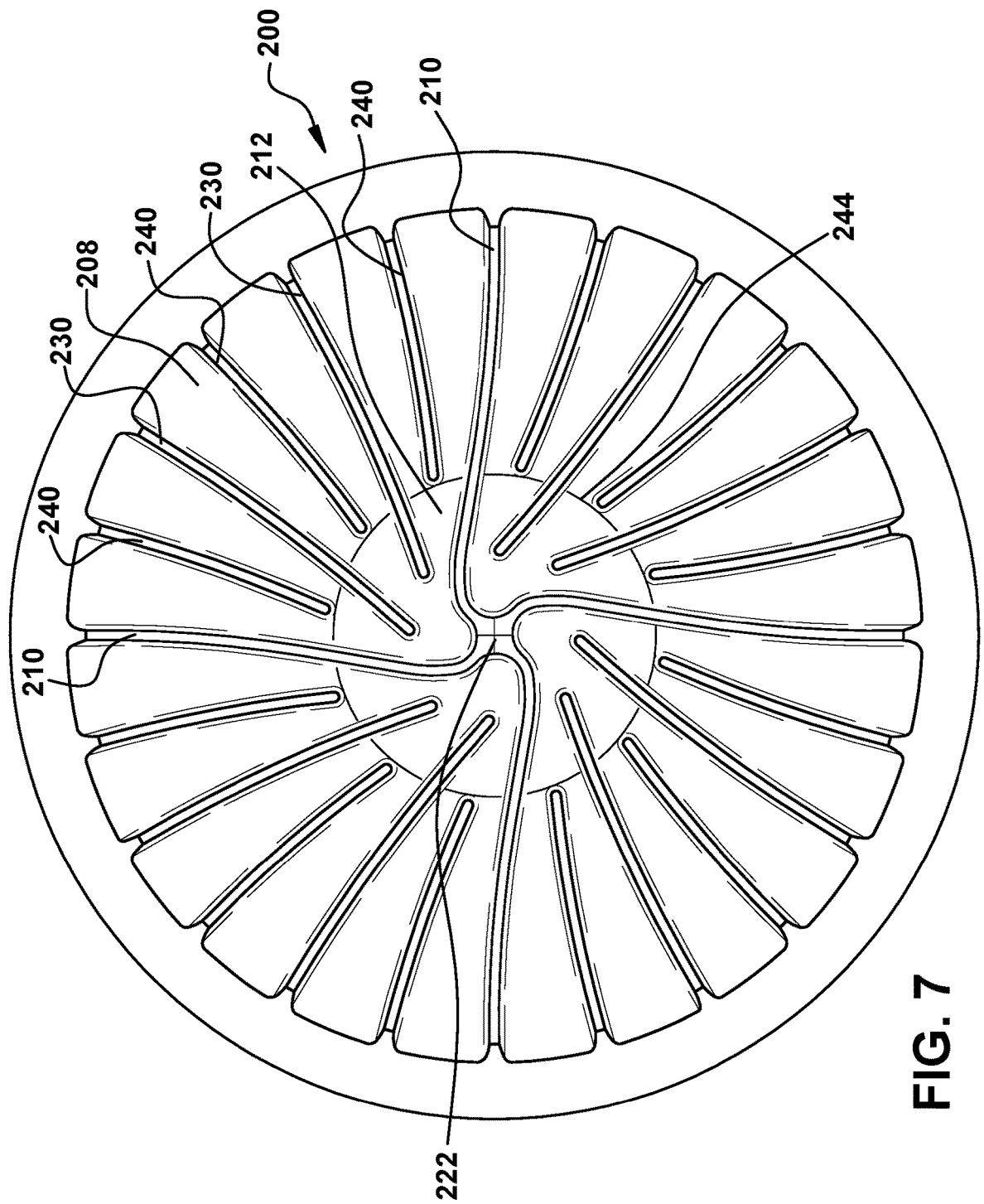
FIG. 7 shows an end view of an extraction impeller, according to other embodiments of the disclosure.
Figure 8:
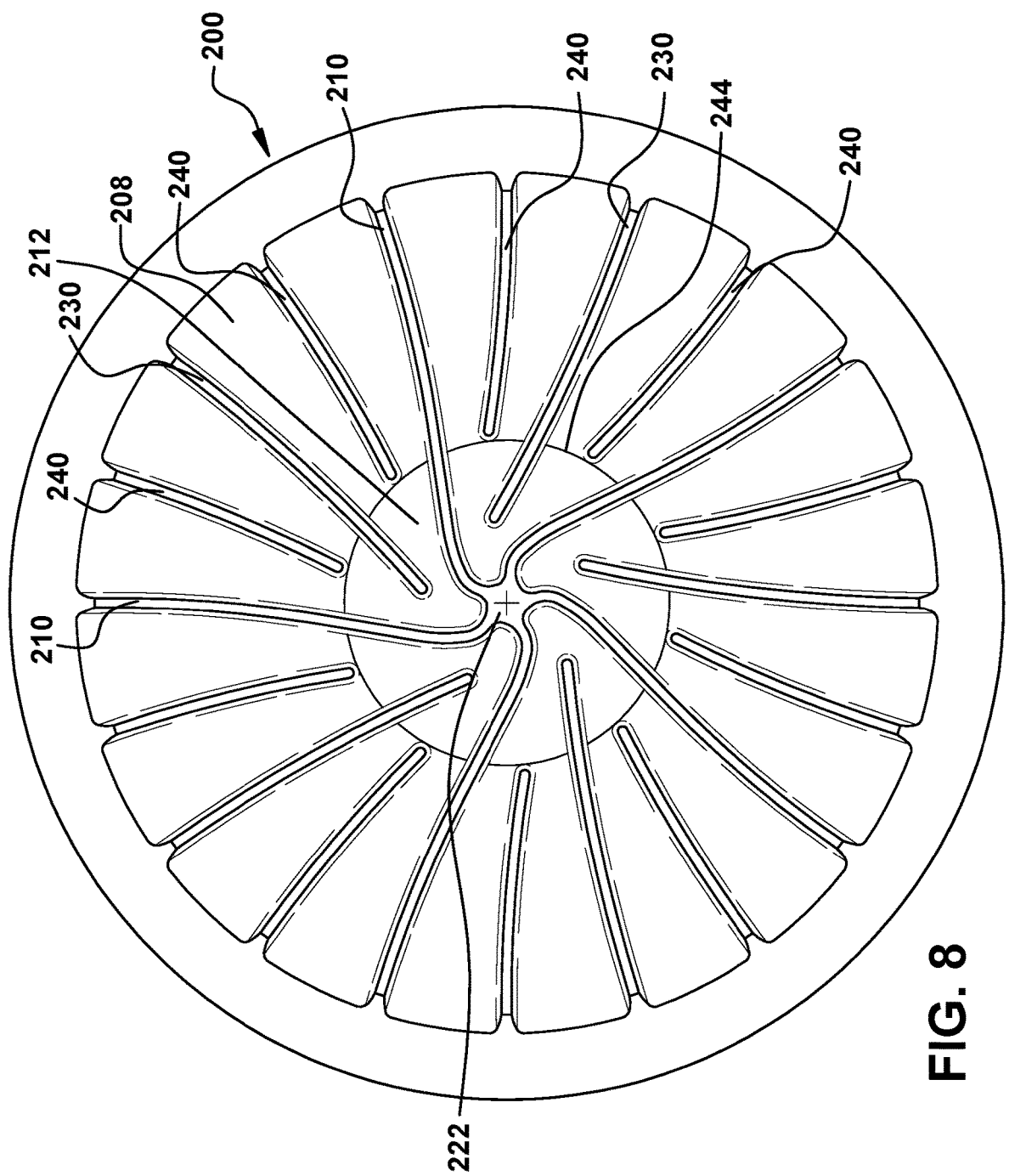
FIG. 8 shows an end view of an extraction impeller, according to additional embodiments of the disclosure.

Other arrangements of vanes are also possible. FIGS. 7-9 show end views of impeller 200, according to various other embodiments of the disclosure. For example, FIG. 7 shows an end view of impeller 200 including only four sets of vanes 210, 230, 240 in an arrangement similar to that in FIGS. 2-4. In the examples shown in FIG. 7, flow outlet hub 222 has four points, one for each first vane 210. In this case, first vanes 210 include four first vanes 210, second vanes 230 include eight (8) second vanes 230 (i.e., with two second vanes 230 between each pair of adjacent first vanes 210), and third vanes 240 include twelve (12) third vanes 240 (i.e., with one third vane 240 between each pair of adjacent second vanes 230 and one third vane 240 between adjacent first vanes 210 and second vanes 230 and one third vane 240 between adjacent first vanes 210 and second vanes 230).

FIG. 8 shows an end view of impeller 200 including five first vanes 210 but with only one second vane 230 between pairs of first vanes 210, and with one third vane 240 between adjacent first vanes 210 and second vanes 230. In this case, first vanes 210 include five first vanes 210, second vanes 230 include five (5) second vanes 230 (i.e., with one second vane 230 between each pair of adjacent first vanes 210), and third vanes 240 include ten (10) third vanes 240 (i.e., with a third vane 240 between each pair of adjacent first vanes 210 and second vanes 230).

FIG. 9 shows an end view of impeller 200 in an arrangement similar to FIGS. 2-3, but in which first and second distances R1, R2 of radial inner ends 234, 236 of second vanes 230A, 230B, respectively, from rotation axis A may be the same, but different than third radial R3 and first and second radial distances R1, R2 are both less than third radial distance R3.

Figure 10:
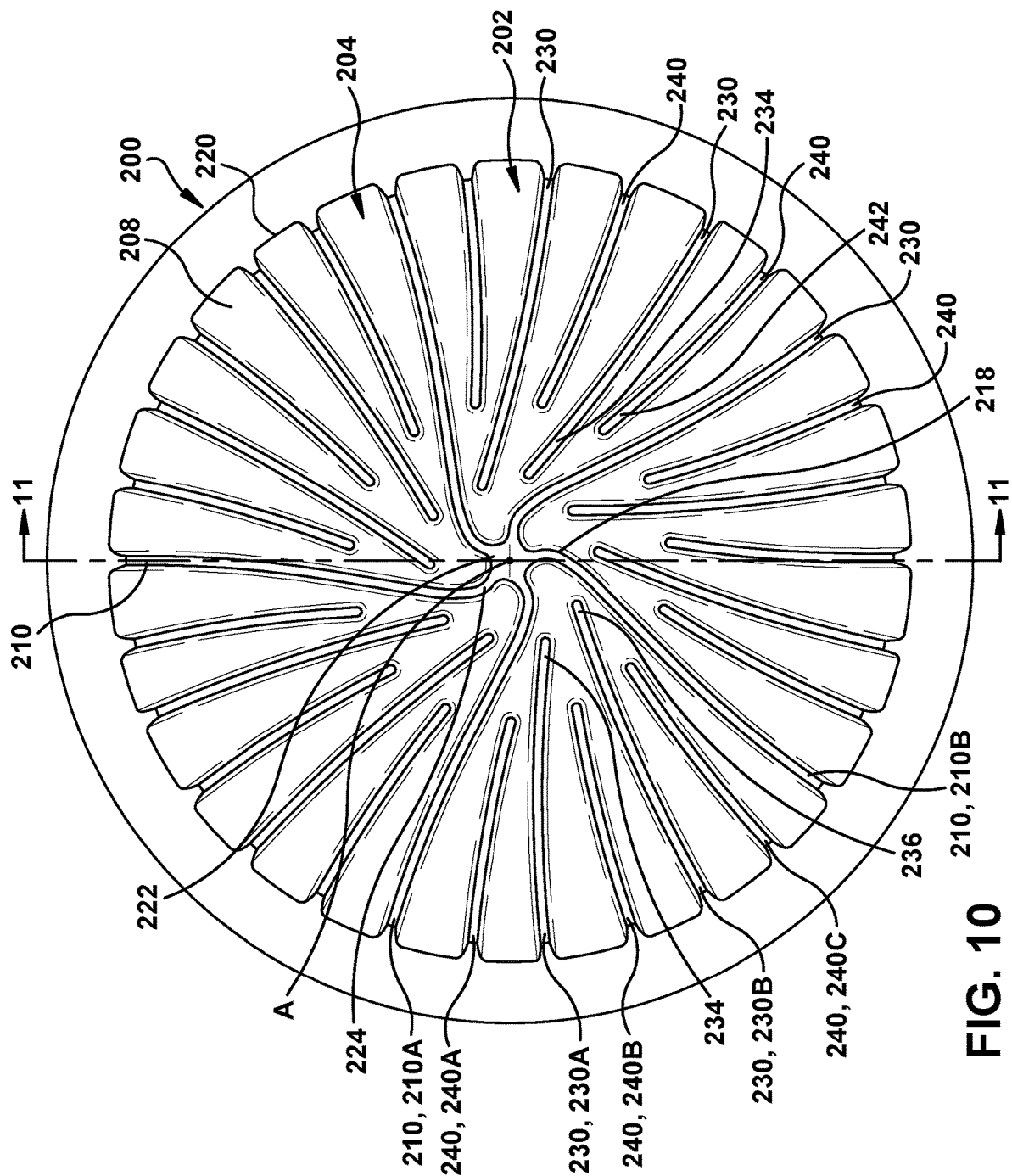
FIG. 10 shows an end view of an extraction impeller, according to other embodiments of the disclosure.
Figure 11:
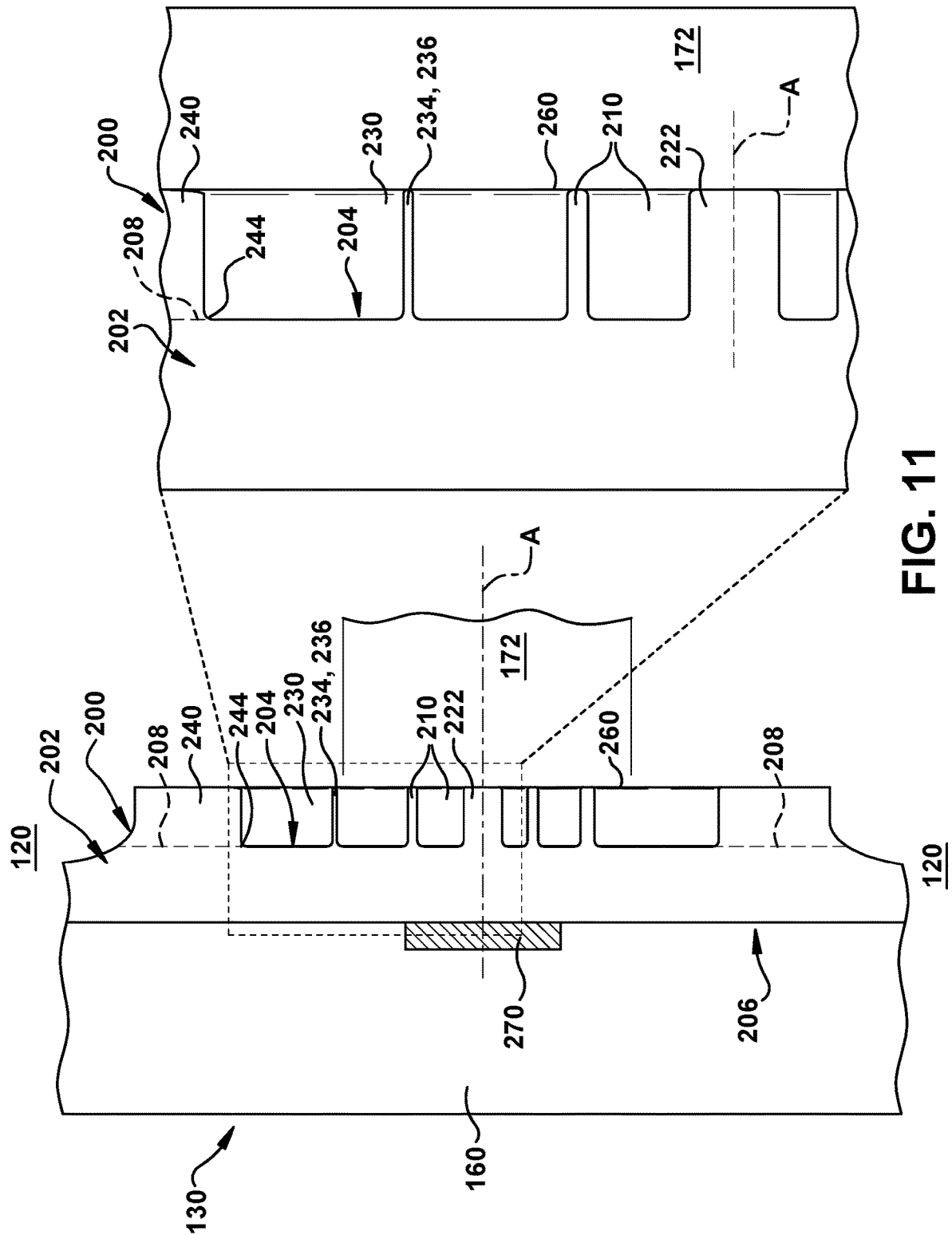
FIG. 11 shows a cross-sectional view of an impeller along view line 11-11 in FIG. 10 and with an enlarged view section, according to embodiments of the disclosure.

FIG. 10 shows an end view of impeller 200, according to other embodiments of the disclosure. FIG. 11 shows a cross-sectional view of impeller 200 along view line 11-11 in FIG. 10 and with an enlarged view section. FIGS. 10 and 11 show an alternative embodiment in which domed portion 212 is omitted, and only planar portion 208 is present. While FIGS. 10 and 11 show the FIG. 2 arrangement of vanes, any vane arrangement described herein can be used without domed portion 212.

Figure 12:
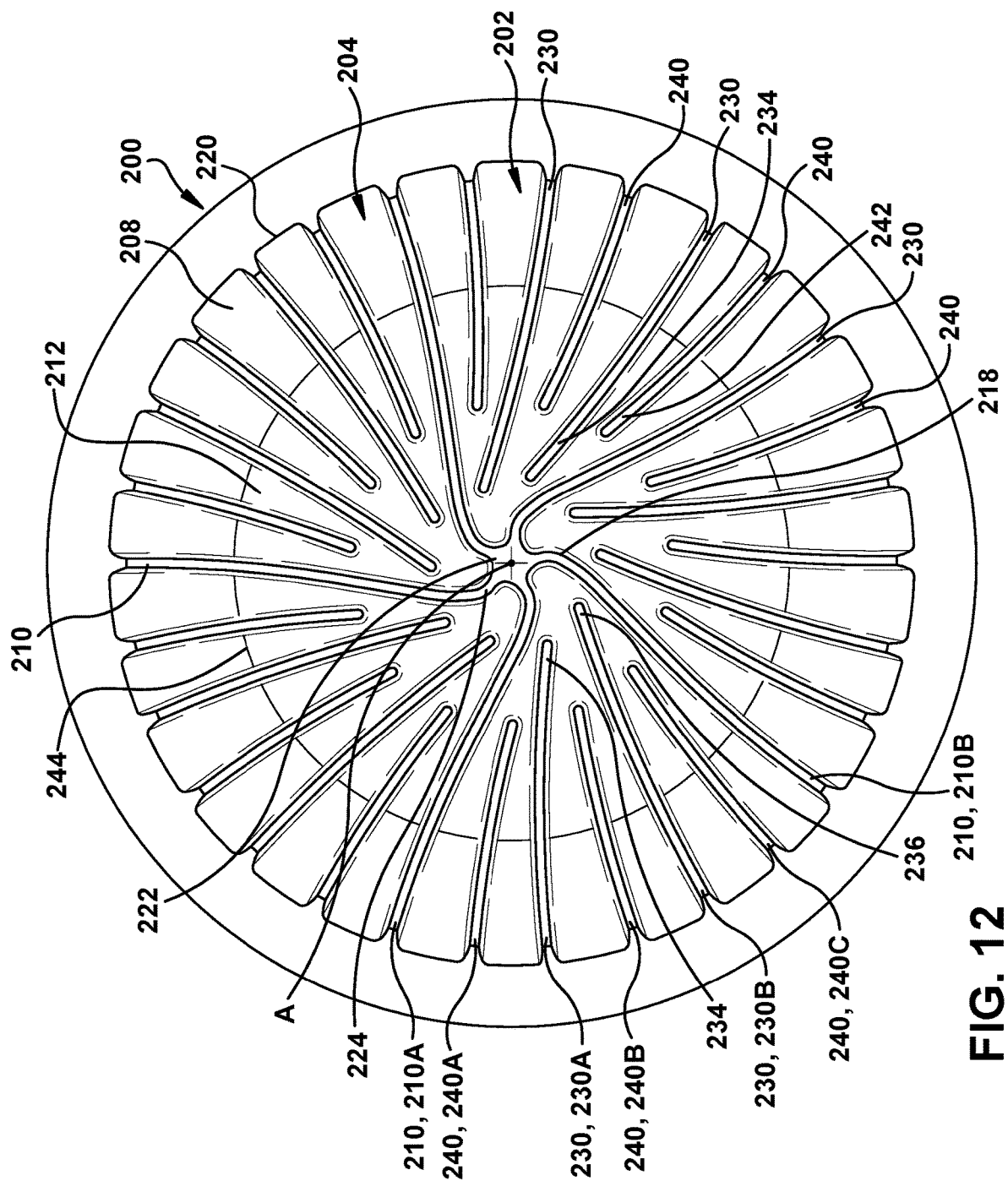
FIG. 12 shows an end view of an extraction impeller, according to other embodiments of the disclosure.

FIG. 12 shows an end view of impeller 200, according to other embodiments of the disclosure. More particularly, FIG. 12 shows an alternative embodiment in which domed portion 212 is located at a location farther radially outward on surface 204 of body 202 than in previously described embodiments. That is, transition line 244 between domed portion 212 and planar portion 208 is farther radially outward from rotation axis A. Also, in contrast to previous embodiments, third vanes 240 extend from outer flow inlet edge 220 to radial inner ends 242 that terminate on domed portion 212, i.e., radial inner ends 242 of third vanes 240 are radially inward of transition line 244 between planar portion 208 and domed portion 212 of surface 204 of body 202. While three radial locations of transition line 244 between planar portion 208 and domed portion 212 on surface 204 of body 202 have been illustrated, other radial locations are possible. For example, transition line 244 can be anywhere between 0% to 50% of a radial extent of surface 204 of body 202 between rotation axis A and outer flow inlet edge 220. While FIG. 12 shows the FIG. 2 arrangement of vanes, any vane arrangement described herein can be used with different radial locations of transition line 244 between planar portion 208 and domed portion 212 of surface 204 of body 202.

While certain arrangements of vanes have been illustrated, it will be recognized that a variety of alternative arrangements are also possible within the scope of the disclosure. The different embodiments described herein can be combined in any manner desired.

In operation, axial compressor 102 includes a plurality of blade stages. Each stage of axial compressor 102 includes wheel body 160 positioning plurality of rotating blade 122 circumferentially thereabout. As rotor 112 rotates, the various stages of blades 122 of axial compressor 102 compress air into compressed air passage 120. A wheel body 160 that includes an impeller 200 can be positioned at any desired axial position along axial compressor 102 having the desired characteristics of compressed air usable for other purposes, e.g., cooling parts of turbine 110 such as rotating blades 152 thereof. (Note, while not shown, more than one wheel 130 may include an impeller 200). Impeller 200 is coupled to the selected wheel body 160 and rotates therewith. Vanes 210, 230 and 240 draw compressed air from compressed air passage 120 radially inwardly toward flow outlet hub 222. Compressed air is directed axially downstream in axial passage 172 defined within axial compressor 102, e.g., toward turbine 110, by the flow's interaction with flow outlet hub 222, vanes 210, 230, 240 and domed portion 212 (where provided). As the extracted, compressed air enters axial passage 172, it exhibits a reduced amount of circumferential or tangential flow compared to extracted, compressed air from conventional impellers. The vane geometry includes first vanes 210 that extend radially inwardly all the way to flow outlet hub 222, i.e., to rotation axis A. The vanes 210, 230, 240, hub 222 and domed portion 212 (the latter, where provided) collectively guide the extracted, compressed air flow to rotation axis A at the center of impeller 200 and converts the circumferential velocity to axial velocity where the flow comes axially out of impeller 200, strengthening the axial velocity at axial passage 172. The extracted, compressed air flows downstream towards turbine 110 where it can be directed in a variety of different directions for purposes such as but not limited to: cooling in turbine 110 in any known fashion or combustion in combustor 104.

Embodiments of the disclosure provide various technical and commercial advantages, examples of which are discussed herein. As noted, the impeller reduces the circumferential or tangential velocity and swirling of the air flow at the exit of the impeller and in the axial passage, which reduces flow unsteadiness.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. "Approximately" or "about," as applied to a particular value of a range, applies to both end values and, unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application and to enable others of ordinary skill in the art to understand the disclosure for various embodiments with various modifications as are suited to the particular use contemplated.

What is claimed is:

1. An extraction impeller for an axial compressor, the extraction impeller comprising:
    a body having a rotation axis and a surface perpendicular to the rotation axis;
    a plurality of first vanes having an elongated S-shape arranged on the surface, the plurality of first vanes extending radially from an outer flow inlet edge of the body to a flow outlet hub centered on the surface at the rotation axis, wherein a radially inner end of each of the plurality of first vanes connect at the flow outlet hub in a direction perpendicular to the rotation axis, and wherein the flow outlet hub centered on the surface at the rotation axis has a multi-pointed star shape with each point thereof coupled to the radial inner end of a respective first vane of the plurality of first vanes;
    a plurality of second vanes arranged on the surface, at least one of the plurality of second vanes between adjacent first vanes; and
    a plurality of third vanes arranged on the surface between any adjacent second vanes and between adjacent first vanes and second vanes,
    wherein the at least one of the plurality of second vanes is radially longer than the plurality of third vanes.

2. The extraction impeller of claim 1, wherein the at least one of the plurality of second vanes includes a fourth vane and a fifth vane arranged on the surface between adjacent first vanes.

3. The extraction impeller of claim 2, wherein the fourth vane has a radially inner end distanced from the rotation axis by a first radial distance, the fifth vane has a radially inner end distanced from the rotation axis by a second radial distance, and each third vane has a radially inner end distanced from the rotation axis by a third radial distance, wherein the first, second and third radial distances are different and the first and second radial distances are less than the third radial distance.

4. The extraction impeller of claim 1, wherein distal axial ends of the plurality of first vanes, the plurality of second vanes and the plurality of third vanes are coplanar.

5. The extraction impeller of claim 4, wherein the surface of the body includes a planar portion and a domed portion surrounding the rotation axis and extending gradually farther axial than the planar portion, wherein radially inner ends of the plurality of first vanes and the plurality of second vanes are axially shorter than radially outer ends of the plurality of first vanes and the plurality of second vanes, respectively.

6. The extraction impeller of claim 5, wherein radially inner ends of the plurality of third vanes are located at a transition line between the planar portion and the domed portion of the surface of the body.

7. The extraction impeller of claim 1, wherein a radially outer end of the plurality of first vanes, the plurality of second vanes and the plurality of third vanes terminate at the outer flow inlet edge of the body.

8. The extraction impeller of claim 1, wherein the body is circular and a radially outer end of the plurality of first vanes, the plurality of second vanes and the plurality of third vanes are circumferentially equidistantly spaced at the outer flow inlet edge of the body.

9. The extraction impeller of claim 1, wherein radially inner ends of the plurality of second vanes and the plurality of third vanes direct an air flow in a direction tangential to the rotation axis.

10. The extraction impeller of claim 9, wherein the plurality of second vanes have a turning angle relative to a radius of the body in a range of 28° to 32°, and wherein the plurality of third vanes have a flow exit angle relative to the radius of the body in a range of 10° to 14°.

11. The extraction impeller of claim 1, wherein the body includes a mount configured to couple to a compressor wheel of an axial compressor, wherein a radial outer region of the body is in fluid communication with a compressed air passage of the axial compressor and a center region of the body is in fluid communication with an axial passage in the axial compressor.

12. The extraction impeller of claim 1, wherein the plurality of first vanes includes five first vanes, the plurality of second vanes includes ten second vanes, and the plurality of third vanes includes fifteen third vanes.

13. A compressor wheel for an axial compressor, the compressor wheel comprising:
    a wheel body for coupling to a rotor;
    a plurality of rotating blades coupled to the main wheel body for compressing air flow in a compressed air passage; and
    an extraction impeller coupled to the wheel body and in fluid communication with the compressed air passage, the extraction impeller including:
        an impeller body having a rotation axis and a surface perpendicular to the rotation axis;
        a plurality of first vanes having an elongated S-shape arranged on the surface, the plurality of first vanes extending radially from an outer flow inlet edge of the impeller body to a flow outlet hub centered on the surface at the rotation axis, wherein a radially inner end of each of the plurality of first vanes connect at the flow outlet hub in a direction perpendicular to the rotation axis, and wherein the flow outlet hub centered on the surface at the rotation axis has a multi-pointed star shape with each point thereof coupled to the radial inner end of a respective first vane of the plurality of first vanes;

a plurality of second vanes arranged on the surface, at least one of the plurality of second vanes between adjacent first vanes; and a plurality of third vanes arranged on the surface between any adjacent second vanes and between adjacent first vanes and second vanes, wherein the at least one of the plurality of second vanes is radially longer than the plurality of third vanes.

14. The compressor wheel of claim 13, wherein the at least one of the plurality of second vanes includes a fourth vane and a fifth vane arranged on the surface between adjacent first vanes.

15. The compressor wheel of claim 14, wherein the fourth vane has a radially inner end distanced from the rotation axis by a first radial distance, the fifth vane has a radially inner end distanced from the rotation axis by a second radial distance, and each third vane has a radially inner end distanced from the rotation axis by a third radial distance, wherein the first, second and third radial distances are different and the first and second radial distances are less than the third radial distance.

16. The compressor wheel of claim 13, wherein distal axial ends of the plurality of first vanes, the plurality of second vanes and the plurality of third vanes are coplanar.

17. The compressor wheel of claim 16, wherein the surface of the body includes a planar portion and a domed portion surrounding the rotation axis and extending gradually farther axial than the planar portion, wherein radially inner ends of the plurality of first vanes and the plurality of second vanes are axially shorter than radially outer ends of the plurality of first vanes and the plurality of second vanes, respectively.

18. The compressor wheel of claim 17, wherein radially inner ends of the plurality of third vanes are located at a transition line between the planar portion and the domed portion of the surface of the body.

19. The compressor wheel of claim 13, wherein a radially outer end of the plurality of first vanes, the plurality of second vanes and the plurality of third vanes terminate at the outer flow inlet edge of the body.

20. The compressor wheel of claim 13, wherein the body is circular and a radially outer end of the plurality of first vanes, the plurality of second vanes and the plurality of third vanes are circumferentially equidistantly spaced at the outer flow inlet edge of the body.

21. The compressor wheel of claim 13, wherein radially inner ends of the plurality of second vanes and the plurality of third vanes direct an air flow in a direction tangential to the rotation axis.

22. The compressor wheel of claim 21, wherein the plurality of second vanes have a turning angle relative to a radius of the body in a range of 28° to 32°, and wherein the plurality of third vanes have a flow exit angle relative to the radius of the body in a range of 10° to 14°.

23. The compressor wheel of claim 13, wherein the body includes a mount configured to couple to a compressor wheel of an axial compressor, wherein a radial outer region of the body is in fluid communication with a compressed air passage of the axial compressor and a center region of the body is in fluid communication with an axial passage in the axial compressor.

24. The compressor wheel of claim 13, wherein the plurality of first vanes includes five first vanes, the plurality of second vanes includes ten second vanes, and the plurality of third vanes includes fifteen third vanes.

25. A gas turbine system, comprising:
an axial compressor including a compressor wheel according to claim 13;
a combustor operatively coupled to the axial compressor; and
a gas turbine operatively coupled to the combustor.

* * * * *